(12) United States Patent
Moll

(10) Patent No.: US 7,237,833 B1
(45) Date of Patent: Jul. 3, 2007

(54) VEHICLE BODY STRUCTURE

(75) Inventor: Daniel Moll, Belleville, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/369,022

(22) Filed: Mar. 7, 2006

(51) Int. Cl.
*B60J 7/00* (2006.01)

(52) U.S. Cl. .................. 296/204; 296/203.04
(58) Field of Classification Search ............. 296/204, 296/203.03, 30, 203.01
See application file for complete search history.

(56) References Cited

U.S. PATENT DOCUMENTS

| 4,408,794 | A | * | 10/1983 | Harasaki ............. 296/203.04 |
| 4,875,733 | A | * | 10/1989 | Chado et al. .......... 296/203.04 |
| 5,011,201 | A | * | 4/1991 | Takahashi et al. ........ 296/204 |
| 5,018,780 | A | * | 5/1991 | Yoshii et al. ............ 296/204 |
| 5,042,872 | A | * | 8/1991 | Yoshii ................ 296/203.02 |
| 5,125,715 | A | * | 6/1992 | Kijima ................ 296/187.09 |
| 5,180,206 | A | * | 1/1993 | Toyoda ................. 296/204 |
| 5,350,214 | A | * | 9/1994 | Yamauchi et al. ......... 296/204 |
| 5,472,259 | A | * | 12/1995 | Akiyama et al. .......... 296/204 |
| 5,549,350 | A | * | 8/1996 | Akiyama et al. .......... 296/204 |
| 5,829,824 | A | * | 11/1998 | Yamamuro et al. ........ 296/204 |
| 5,921,618 | A | * | 7/1999 | Mori et al. ............. 296/204 |
| 6,168,228 | B1 | * | 1/2001 | Heinz et al. ............ 296/204 |
| 6,568,747 | B2 | * | 5/2003 | Kobayashi .............. 296/204 |
| 6,641,168 | B2 | * | 11/2003 | Heise et al. ............ 280/781 |
| 6,926,351 | B2 | | 8/2005 | Telehowski et al. |
| 7,021,703 | B2 | * | 4/2006 | Yamaguchi et al. ... 296/203.04 |
| 2004/0051292 | A1 | * | 3/2004 | Tamura ................ 280/781 |

* cited by examiner

*Primary Examiner*—Kiran B. Patel
(74) *Attorney, Agent, or Firm*—Global IP Counselors, LLP

(57) ABSTRACT

A gusset includes a floor attachment end, a side wall attachment end and an intermediate section. The floor attachment end is fixed to a reinforced floor portion of a vehicle. The side wall attachment end is fixed to a vehicle side wall structure at a point spaced apart from a side wall structure of the vehicle. The intermediate section has a generally U-shaped transverse cross section formed from generally upwardly oriented first and second gusset portions interconnected at upper ends by a top gusset portion. The reinforcement member is disposed within the gusset at a location between the floor and side wall attachment ends of the gusset. The reinforcement member interconnects the first and second gusset portions.

19 Claims, 9 Drawing Sheets

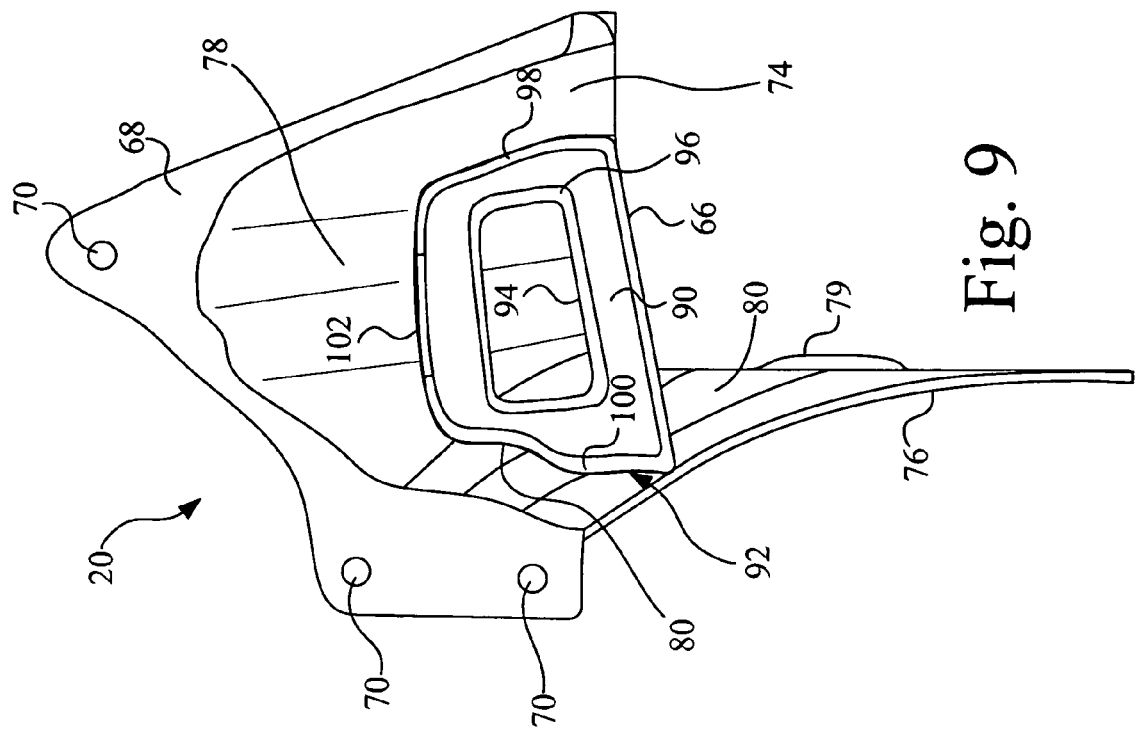
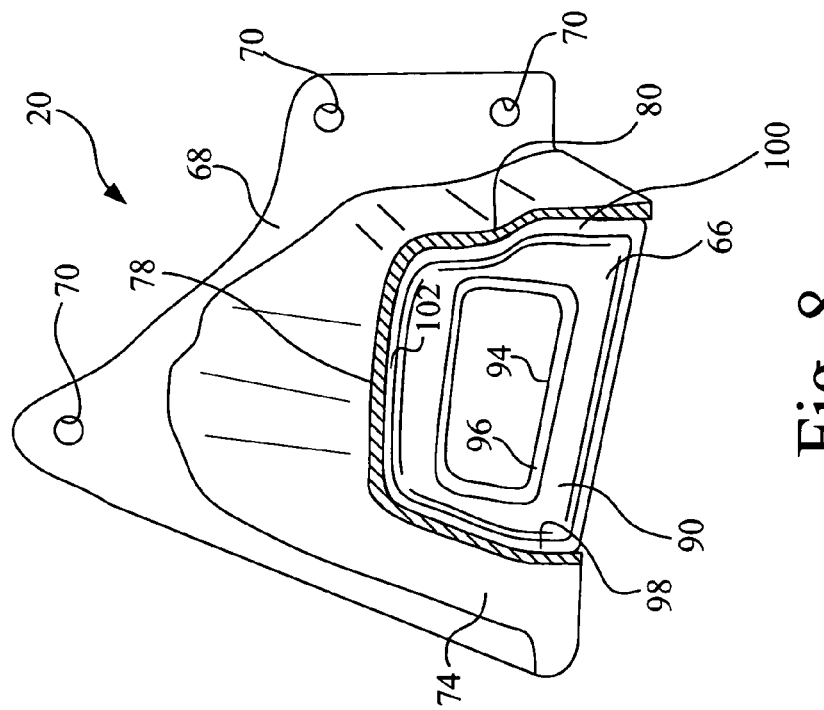

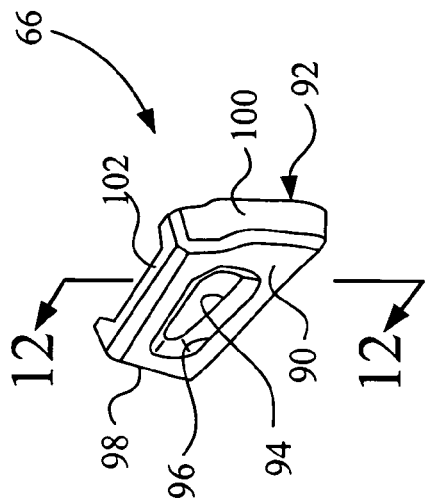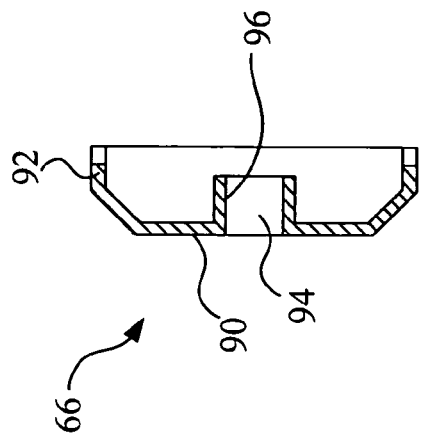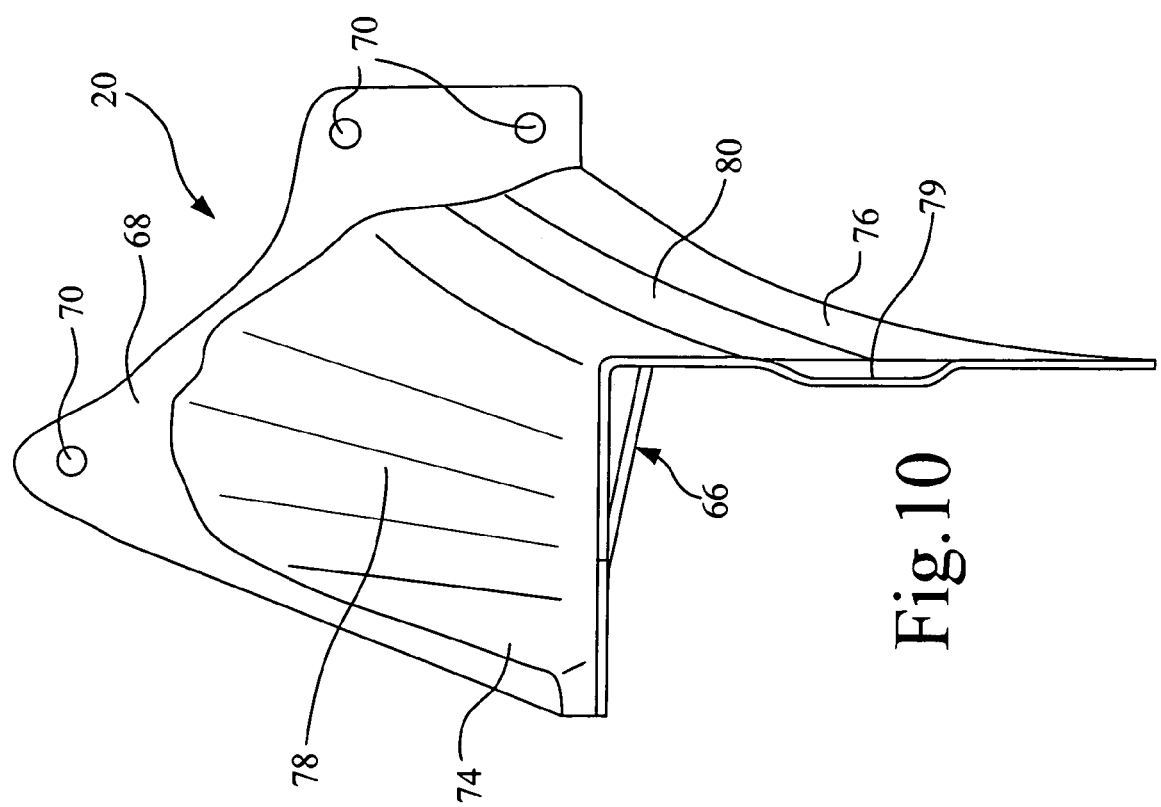

VEHICLE BODY STRUCTURE

BACKGROUND OF THE INVENTION

1. Field of the Invention

The present invention generally relates to a vehicle body structure. More specifically, the present invention relates to a vehicle body structure that includes a reinforcing gusset.

2. Background Information

A variety of vehicle body constructions are broadly classified into two categories: (1) a unibody or unitized construction in which a self-supporting body has a plurality of rigidity members integrated therewith; and (2) a frame on chassis or framed construction in which a separate body is connected to a structural framework. The framed construction is mainly applied to commercial vehicles and trucks. Most passenger vehicles utilize a conventional unitized (self-supporting) vehicle body that is built from sheet metal components onto which body panels are welded. Generally, the structural configurations of these unitized vehicle bodies are continuously being improved for a variety of reasons. For instance, these unitized vehicle bodies have been developed so as to simplify the assembly process, and thereby reducing manufacturing costs. Moreover, these unitized vehicle bodies have been extensively redesigned over the years to improve the strength and rigidity of the vehicle in the event of impact from the side.

Some vehicles, especially two-door vehicles generally known as coupes, include various structural elements in order to strengthen the side wall area of the vehicle structure. Depending on the configuration of the vehicle body, a gusset is used between each of the side walls of the vehicle body and the floor to strengthen and provide rigidity to the vehicle structure. These gussets are designed to transfer the load of a side impact across the vehicle to minimize inward deflection of the side wall during a side impact. These gussets are designed to undergo as little deformation during side impacts as possible and thereby maximize transference of load through the gusset. Thus, it is desirable to maximize the rigidity of these gussets, i.e., limit deformation of the gusset.

In view of the above, it will be apparent to those skilled in the art from this disclosure that there exists a need for an improved gusset. This invention addresses this need in the art as well as other needs, which will become apparent to those skilled in the art from this disclosure.

SUMMARY OF THE INVENTION

It has been discovered that in order to improve the load bearing capabilities of a vehicle floor structure, a gusset can be installed between a floor structural member and a side wall of a vehicle body to provide additional rigidity and improved side impact load bearing characteristics to the vehicle.

One object of the present invention is to a vehicle body structure with a gusset that is installed between a floor structural member and a side wall of a vehicle body to maximize transference of load through the gusset by limiting deformation of the gusset.

Another object of the present invention is to strengthen a gusset without increasing its overall size.

In accordance with one aspect of the present invention, a vehicle body structure includes a vehicle floor structure, a vehicle side wall structure, a gusset and a reinforcement member. The vehicle floor structure includes a laterally extending reinforced portion. The vehicle side wall structure extends in a generally upward direction from the vehicle floor structure to form a vehicle body corner. The gusset includes a floor attachment end, a side wall attachment end and an intermediate section. The floor attachment end is fixed to the reinforced floor portion. The side wall attachment end is fixed to the vehicle side wall structure at a point spaced apart from the side wall structure. The intermediate section has a generally U-shaped transverse cross section formed from generally upwardly oriented first and second gusset portions interconnected at upper ends by a top gusset portion. The reinforcement member is disposed within the gusset at a location between the floor and side wall attachment ends of the gusset. The reinforcement member interconnects the first and second gusset portions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a cross-sectional view of the gusset taken along the line 8-8 in FIG. 7, showing a reinforcement member in accordance with the present invention;

FIG. 9 is an outboard end elevational view of the gusset looking at a side wall attachment end thereof in the direction of the arrow 9 in FIG. 7 in accordance with the present invention;

FIG. 10 is an inboard end elevation of the gusset looking at a vehicle floor attachment end thereof in the direction of the arrow 10 in FIG. 7 in accordance with the present invention;

FIG. 11 is a perspective view of the reinforcement member shown removed from the gusset in accordance with the present invention; and FIG. 12 is a cross-sectional view of the reinforcement member taken along the line 12-12 in FIG. 11 in accordance with the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
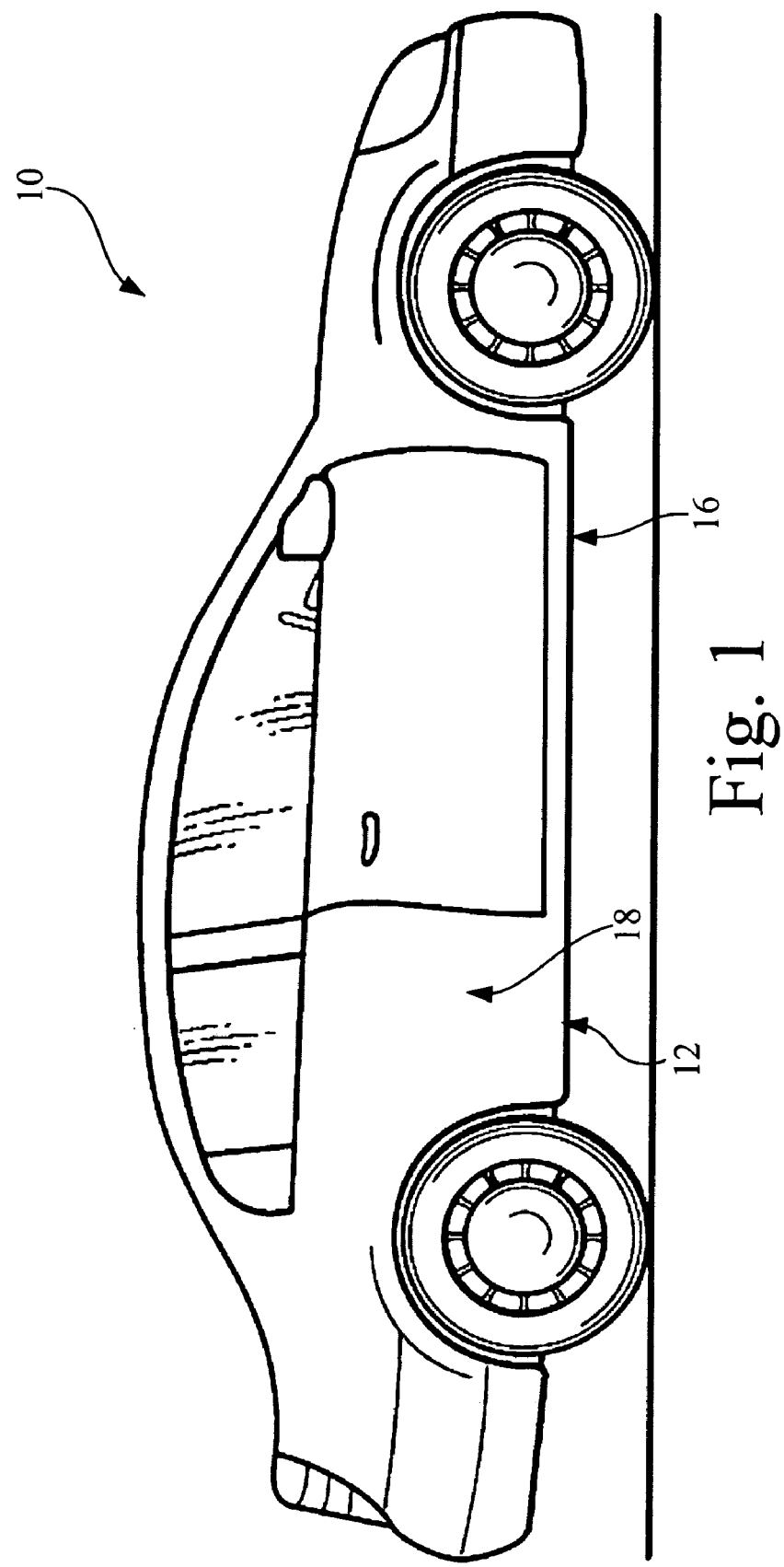
FIG. 1 is a side elevational view of a vehicle that includes a reinforced gusset in accordance with the present invention.
Figure 2:
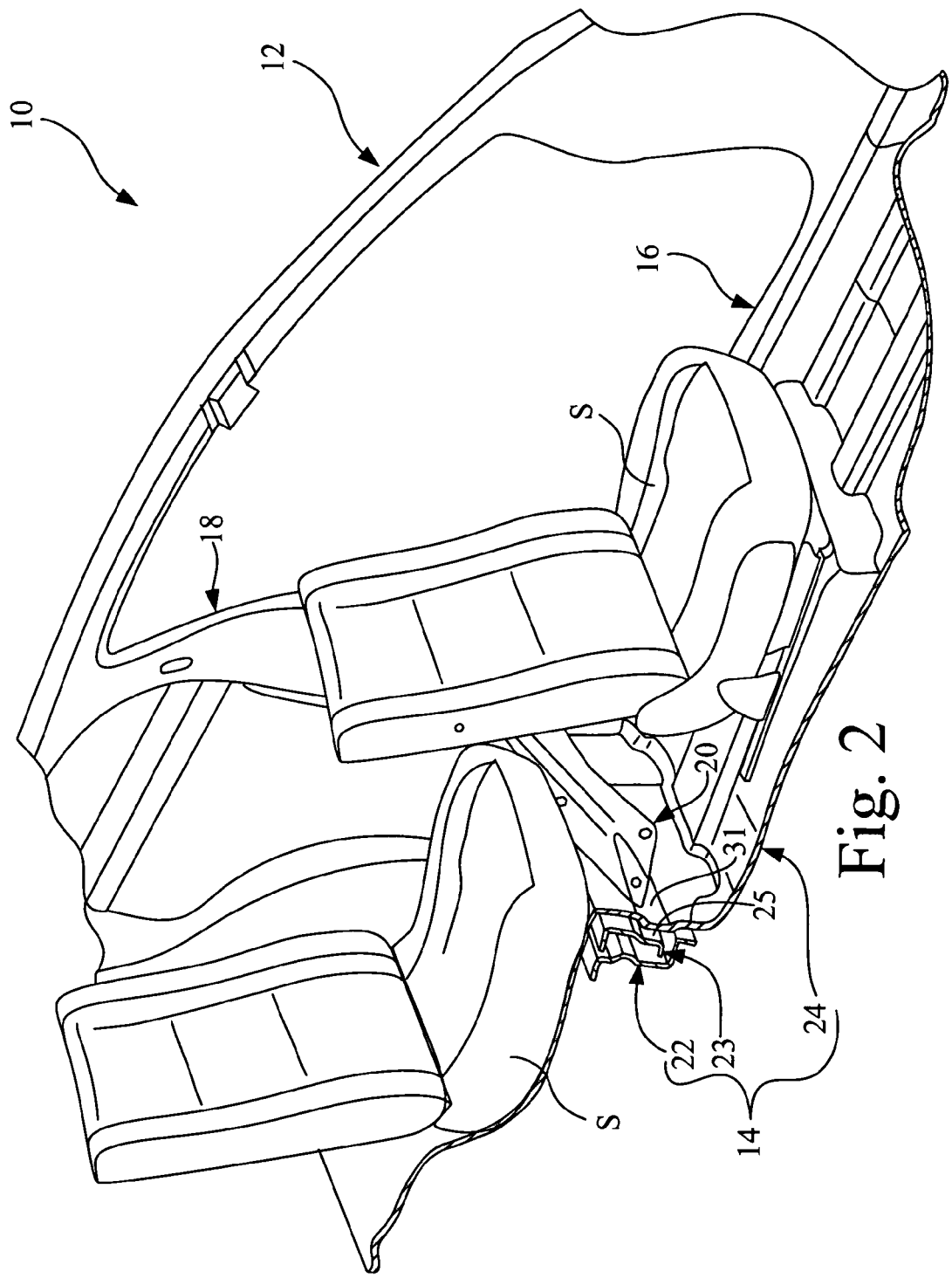
FIG. 2 is a perspective view of an interior portion of the vehicle, including a floor structure, a side wall structure and one of the gussets in accordance with the present invention.
Figure 3:
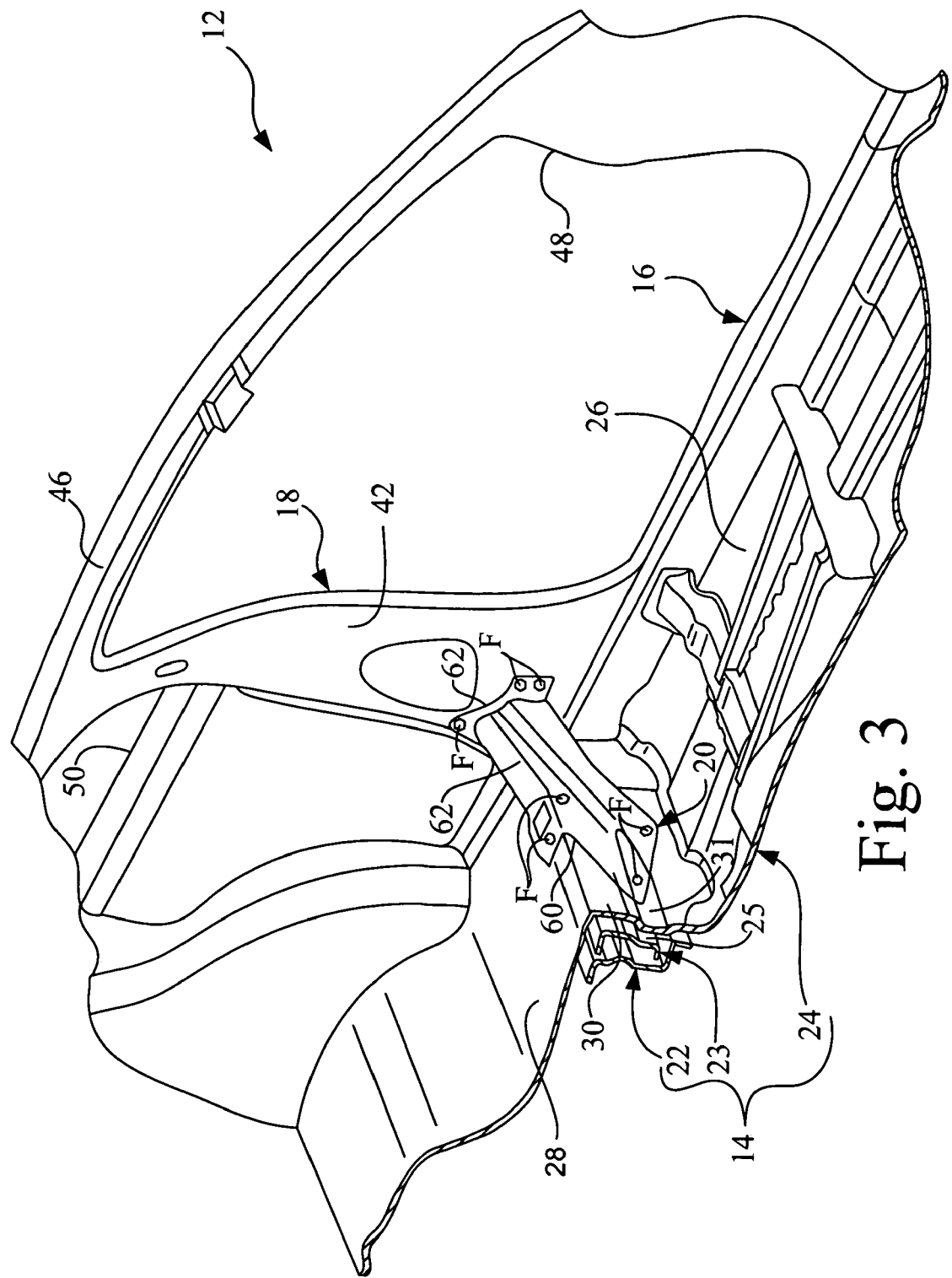
FIG. 3 is another perspective view, similar to FIG. 2, of the interior portion of the vehicle, but with the seats removed to show details of the floor structure, the side wall structure and the gusset in accordance with the present invention.

Referring initially to FIGS. 1-3, a vehicle 10 is illustrated with a vehicle body structure 12 in accordance with a first embodiment of the present invention. The vehicle body structure 12 is particularly useful when the vehicle 10 is a coupe or two-door type of vehicle. As shown in FIGS. 2 and 3, the vehicle body structure 12 basically includes a vehicle floor structure 14, a pair of sill structures 16, a pair of vehicle side wall structures 18 and a pair of gussets 20 (only one shown) as well as a variety of other conventional vehicle structural features (not shown). For the sake of brevity, only one side of the vehicle body structure 12 is described and illustrated in detail herein. For instance, description of only one sill structure 16, one side wall structure 18 and one gusset 20 is described below. However it should be understood from the drawings and the description herein that the description of one side (driver's side) of the vehicle body structure 12 applies to both sides (passenger's side and driver's side) of the vehicle body structure 12. In other words, the passenger's side of the vehicle body structure 12 includes the same configuration of the sill structure 16, the vehicle side wall structure 18 and the gusset 20 as the driver's side of the vehicle body structure 12.

Also it should be understood from the drawings and description herein that various portions and components of the vehicle body structure have been omitted for the sake of brevity and clarity. For example, trunk, firewall, windshield, windows, doors, and engine compartment related structural feature of the vehicle body structure 12 have been omitted in order to focus on those features and components of the vehicle body structure 12 related to or peripheral to the present invention.

Figure 4:
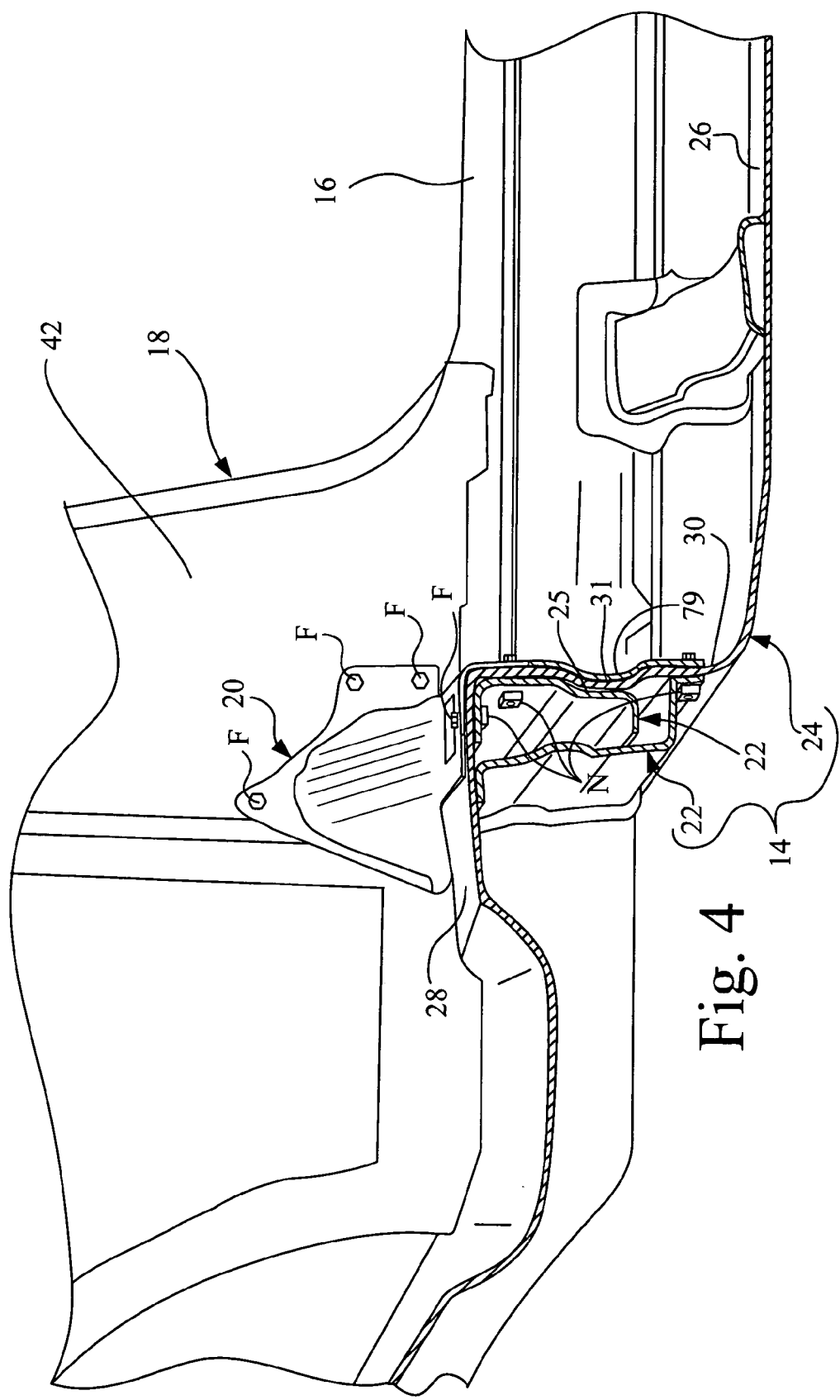
FIG. 4 is a longitudinal cross-sectional view of the floor structure and the gusset in accordance with the present invention.

With specific reference to FIGS. 3 and 4, a description of the vehicle floor structure 14 is now provided. The vehicle floor structure 14 is configured and arranged to support a plurality of seats S. The vehicle floor structure 14, among other elements and components, basically includes a lateral cross member 22, lateral cross member 23 and a floor panel 24 which constitute a laterally extending reinforced floor portion. It should be understood from the drawing and description herein that the vehicle floor structure 14 can include several lateral cross members and/or other structural supports as needed and/or desired. However for the purposes of describing present invention only the lateral cross members 22 and 23 will be described herein. Further, the floor panel 24 is depicted in the drawings as a single metallic member. However it should be understood from the drawings and the description herein that the floor panel 24 can be made of several overlapping shaped sheet portions welded together to form the floor panel 24.

The lateral cross members 22 and 23 are rigidly fixed, bonded or welded to the sill structure 16 and to the floor panel 24 in a conventional manner. The lateral cross member 22 includes a variety of ribs and flanged sections in order to provide strength and rigidity to the vehicle floor structure 14. As shown in FIG. 4, a lower flange section of the lateral cross member 22 includes at least one nut N welded in place.

The lateral cross member 23 extends parallel to the lateral cross member 23 and is also welded to the floor panel 24, as shown in FIG. 4. The lateral cross member 23 includes a variety of reinforcement flanges and ribs, such as the offset 25. The lateral cross member 23 includes several nuts N with threaded apertures welded thereto for receiving fasteners F for attaching the gusset 20 as shown in FIG. 4 and described in greater detail below.

The floor panel 24 basically includes a generally horizontal front seat supporting portion 26, a generally horizontal back seat supporting portion 28 and a vertical portion 30 that extends between the front seat supporting portion 26 and the back seat supporting portion 28. The vertical portion 30 is preferably bonded, welded or otherwise fixed to the lateral cross number 23 as indicated in FIGS. 3 and 4. The vertical portion 30 also includes an offset portion 31 that conforms to the offset portion 25 in the lateral cross member 23.

Figure 5:
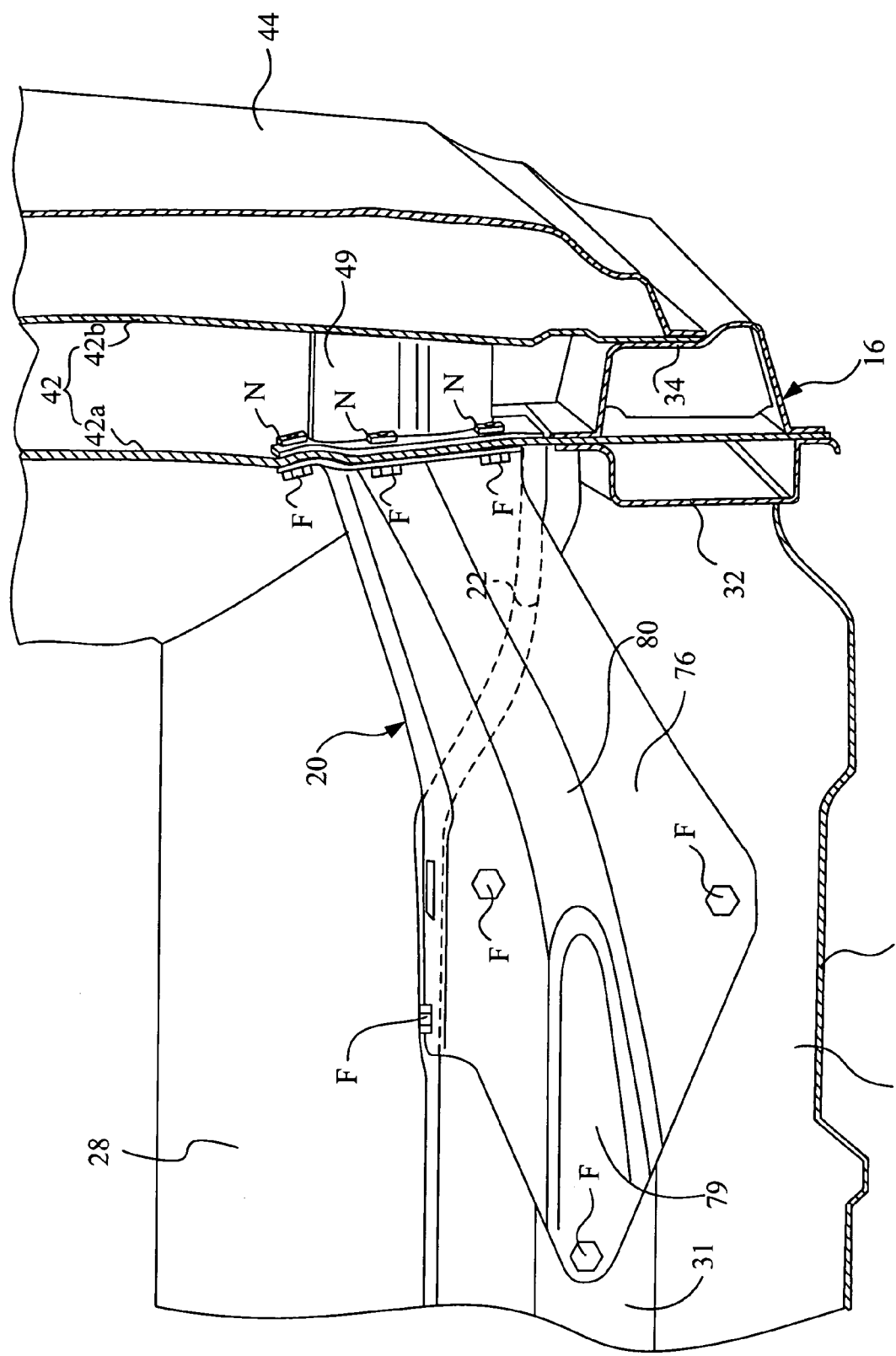
FIG. 5 is a transverse cross-sectional view of the floor structure, the B-pillar of the side wall structure and the gusset in accordance with the present invention.

With specific reference to FIGS. 4 and 5, a description of the sill structure 16 is now provided. The sill structure 16 is elongated structure that extends longitudinally along the side of the vehicle body structure 12. The sill structure 16 basically includes a variety of conventional sill structure elements that extend along the sides of the vehicle body structure 12. For instance, the sill structure 16 includes an inner sill rail 32 and an outer sill rail 34. The inner and outer sill rails 32 and 34 are welded to one another throughout most of their longitudinal length, except for insertion therebetween of a portion of the side wall structure 18, described further below.

Figure 6:
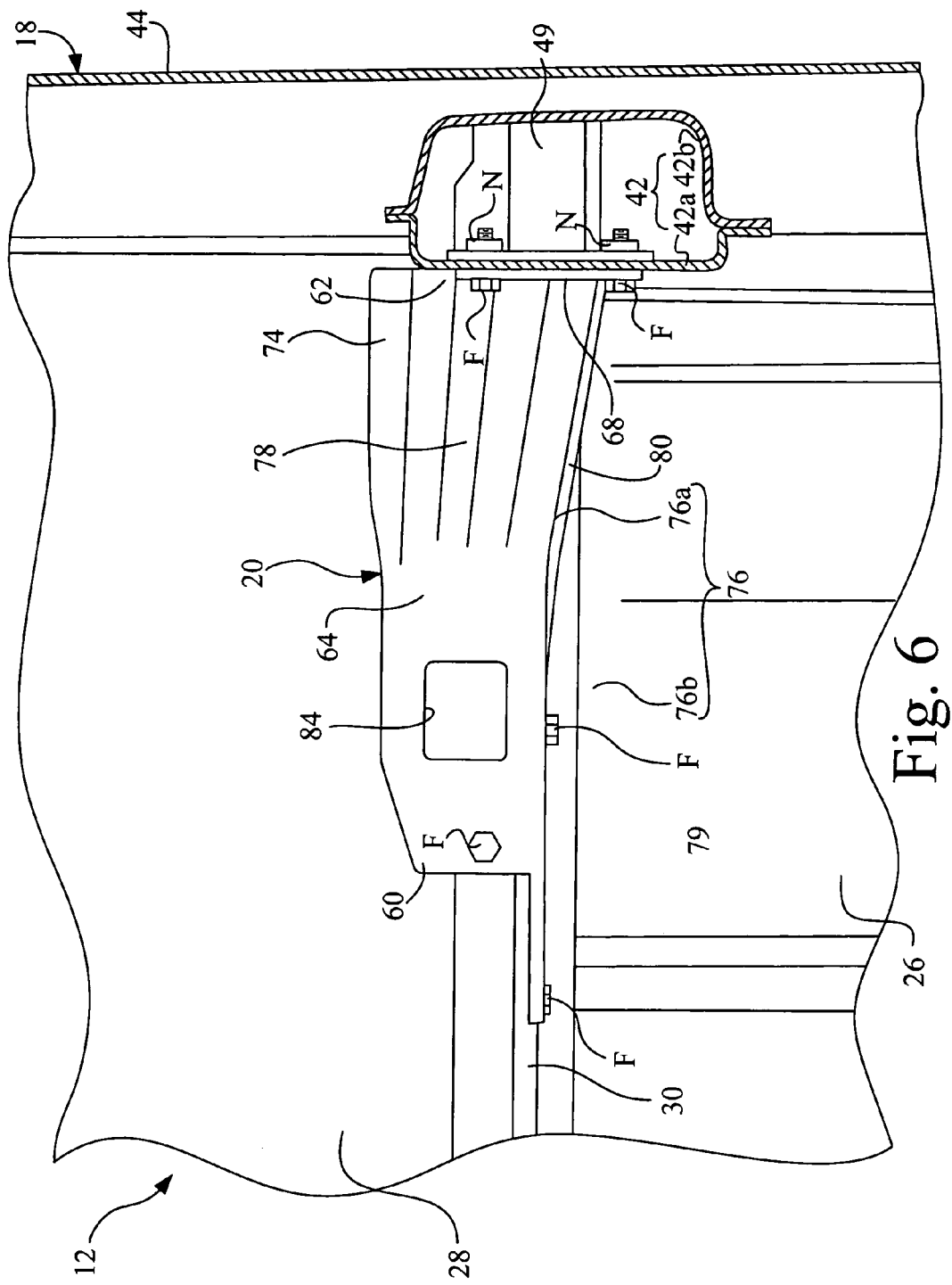
FIG. 6 is a transverse cross-sectional view of the B-pillar of the side wall structure with the floor structure and the gusset of the present invention shown in elevation.

With specific reference to FIGS. 5-6, a description of the vehicle side wall structure 18 is now provided. The side wall structure 18 extends in a generally upward direction from the vehicle floor structure 14 and the sill structure 16 to form a vehicle body corner. The side wall structure 18 is approximately perpendicular to the floor panel 24, being inclined slightly in a manner dependent upon aesthetic and design considerations. The side wall structure 18 basically includes a B-pillar structure 42, a side panel 44 (FIGS. 5 and 6 only) and a roof side rail assembly 46 (see FIG. 3). The B-pillar structure 42 is a tubular structure that is, for example, made from two panels 42a and 42b welded together in the form of a vertical tube. A lower end of the panel 42a extends between the inner and outer sill rails 32 and 34 and is welded thereto, as shown in FIG. 5. A reinforcement member 49 is fixed in place between the panels 42a and 42b. The reinforcement member 49 is preferably welded to a lower portion of each of the panels 42a and 42b of the B-pillar structure 42 above the sill structure 16. The reinforcement member 49 includes a plate or flange with threaded nuts N that are welded in position, as shown in FIGS. 5 and 6.

The side panel 44 is an exterior component of the vehicle 10 that is welded at strategic points to other members of the side wall structure 18. For example, a lower edge of the side panel 44 is welded to the outer sill rail 34 as shown in FIG. 5. The roof side rail assembly 46 is typically made in a conventional manner with at least two panel members that are welded together to form a beam to which a roof (not shown) and an upper edge of the side panel 44 are welded. As shown in FIG. 3, a door opening 48 is defined between the sill structure 16, the B-pillar structure 42 and a roof side rail assembly 46. As also shown in FIG. 3, a rear window opening 50 is defined below the roof side rail assembly 46, rearward from the B-pillar structure 42.

Figure 7:
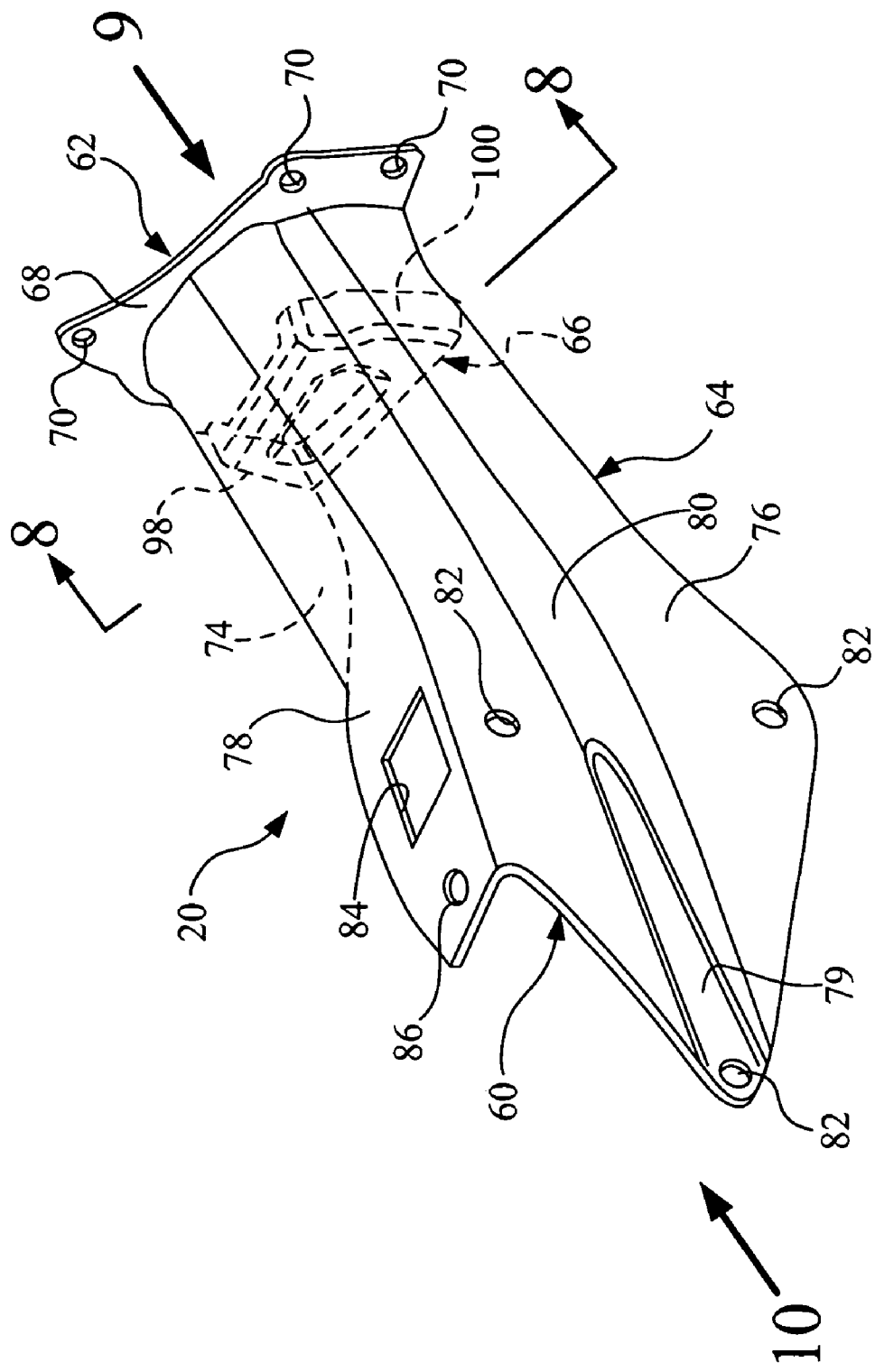
FIG. 7 is a perspective view showing the gusset removed from the vehicle to provide greater clarity in accordance with the present invention.

With specific reference now the FIG. 7, a description is now provided of the gusset 20. The gusset 20 is preferably made of sheet metal that is bent so as to form a reinforcement member. The gusset 20 basically includes a floor attachment end 60, a side wall attachment end 62, an intermediate section 64 and a reinforcement member 66. The side wall attachment end 62 includes an attachment flange 68 that extends outwardly from the intermediate section 64 and which conforms in shape and direction of extension to the panel 42a of the B-pillar structure 42. The attachment flange 68 includes apertures 70 for fastener attachment to nuts N of the reinforcement member 49 within the B-pillar structure 42. The intermediate section 64 basically includes a first gusset portion 74, a second gusset portion 76 and a top gusset portion 78.

The first gusset portion 74 extends upwardly or in an approximately vertical orientation when installed in the vehicle 10. The second gusset portion 76 also extends upwardly with a generally vertical orientation but is larger and longer than the first gusset portion 74. Further, the second gusset portion 76 is at least partially parallel to the first gusset portion 74, but includes an offset portion 79 so as to confirm to the general shape of offset portion 31 in the vertical portion 30 of the floor structure 14. The second gusset portion 76 also includes an arcuate shaped section or reinforcing rib 80 that extends from the offset portion 79 to the attachment flange 68. The second gusset portion 76 is further formed with a plurality of apertures 82.

The top gusset portion 78 extends from the side wall attachment end 62 beyond the first gusset portion 74 but is not as long as the second gusset portion 76. The top gusset portion 78 is somewhat inclined extending from the side wall attachment end 62 towards to the floor attachment end 60. More specifically, the top gusset portion 78 slopes upwardly from the floor attachment end 60 to the side wall attachment end 62 of the gusset 20.

As shown in FIG. 6, the gusset 20 extends laterally within the vehicle 10, approximately perpendicular to a longitudinal direction of the vehicle 10. However, the floor attachment end 60 and the side wall attachment end 62 are slightly offset from one another such that the side wall attachment end 62 extends slightly forward from the floor attachment end 60 in order to attach to the B-pillar structure 42. Consequently as the second gusset portion 76 is divided into a side wall portion 76a and a central portion 76b that are angularly offset from one another, as indicated only in FIG. 6. The offset portion 80 extends from the central portion 76b to through the length of the side wall portion 76a.

The top gusset portion 78 is formed with an opening 84 and an aperture 86. The opening 84 allows access to a seat mounting portion of the floor structure 14. The aperture 86 allows for installation of fastener for fixing a gusset 22 to the floor structure 14.

The intermediate section 64 has an inverted generally U-shaped transverse cross section as shown in FIGS. 8, 9 and 10. The U-shape is defined or formed generally by the first and second gusset portions 74 and 76 and the top gusset portion 78. The top gusset portion 78 slopes upwardly from the floor attachment end 60 of gusset to the side wall attachment end 62 of gusset 20.

With specific reference to the FIGS. 8, 9, 11 and 12, a description now provided of the reinforcement member 66. The reinforcement member 66 is made of metal and basically includes a body portion 90 and flange 92 (FIGS. 9, 11 and 12). The body portion 90 is formed with an opening 94 that is encompassed by a protruding rim 96, thereby adding to the rigidity of the body portion 90 as shown in FIG. 12. The protruding rim 96 extends from the body portion 90 in a direction that is generally horizontal and approximately perpendicular to the B-pillar structure 42.

As shown in FIG. 11, the flange 92 includes a first flange portion 98, a second flange portion 100 and a reinforcing flange portion 102. The first and second flange portions 98 and 100 are approximately perpendicular to the body portion 90. As indicated in FIG. 7, the first flange portion 98 is fixedly attached to the first gusset portion 74. The second flange portion 100 is fixedly attached to the second gusset portion 76. The reinforcing flange portion 102 extends around the body portion 90 between the first and second flange portions 98 and 100 to form a continuous flange as indicated in FIGS. 8 and 9. The reinforcing flange portion 102 is preferably connected to the top gusset portion 78, but can alternatively be spaced apart therefrom.

The flange 92 is preferably welded to the gusset 20. Specifically, the first flange portion 98 is preferably bonded or otherwise welded to the first gusset portion 74. The second flange portion 100 is preferably bonded or otherwise welded to the second gusset portion 76. Further, the reinforcing flange portion 102 is optionally bonded and/or welded to the top gusset portion 78. The reinforcement member 66 is fixed to the gusset 20 at the point that is spaced apart from the B-pillar structure 42.

The reinforcement member 66 has overall height that extends majority of the height of the first gusset portion 74 as measure from the top gusset portion 78 to free end (lower end) of the first gusset portion 74. The body portion 90 of reinforcement number 66 is oriented in generally vertical orientation and is generally parallel to the B-pillar structure 42 after the gusset 20 has been installed within the vehicle body structure 12.

As shown in FIGS. 3-6, the gusset 20 is mounted to the vehicle structure 12 by the fasteners F as follows. As shown in FIGS. 3, 4 and 5, the side wall attachment end 62 of the gusset 20 is fixed to the B-pillar structure 42 of the side wall structure 18. More specifically, three of the fasteners F are inserted into the apertures 70 formed in the attachment flange 68 of the side wall attachment end 62 of the gusset 20 and extend into the nuts N fixed to the reinforcement member 49 within the B-pillar structure 42 of the side wall structure 18.

As shown in FIGS. 3, 5 and 6, the floor attachment end 60 of the gusset 20 is fixed to the lateral cross member 22 (the reinforced portion of the floor structure 14). More specifically, three of the fasteners F are inserted through the apertures 82 formed in the second gusset portion 76 of the intermediate section 64 of gusset 20 and into the nuts N welded to the lateral cross member 22. Another one of the fastener F is inserted through the hole 86 in the top gusset portion 78 of the gusset 20 and into the nut N welded to an interior upper portion of the lateral cross member 22. It should be understood from the drawings and description here in that the panel 42a is provided with apertures (not shown) aligned with the nuts N in the reinforcement member 49 and the back seat supporting portion 28 and the vertical portion 30 of the floor pane 24 are also provided with apertures (not shown) aligned with the nuts N in the lateral cross member 22 to allow insertion of the fasteners F.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a vehicle floor structure including a laterally extending reinforced portion;
   a vehicle side wall structure extending in a generally upward direction from the vehicle floor structure to form a vehicle body corner;
   a gusset including a floor attachment end fixed to the reinforced floor portion at a point spaced apart from the side wall structure, a side wall attachment end fixed to the vehicle side wall structure, and an intermediate section having a generally U-shaped transverse cross section formed from generally upwardly oriented first and second gusset portions interconnected at upper ends by a top gusset portion; and
   a reinforcement member disposed within the gusset at a location between the floor and side wall attachment ends of the gusset, the reinforcement member interconnecting the first and second gusset portions.

2. The vehicle body structure as set forth in claim 1, wherein
   the reinforcement member includes a body portion and first and second flange portions, the first and second flange portions being approximately perpendicular to the body portion, the first flange portion being fixedly attached to the first gusset portion and the second flange portion being fixedly attached to the second gusset portion.

3. The vehicle body structure as set forth in claim 2, wherein
   the first and second flange portions are each fastened at two points to the first and second gusset portions, respectively.

4. The vehicle body structure as set forth in claim 2, wherein
   the reinforcement member further includes a reinforcing flange portion that extends between the first and second flange portions to form a continuous flange.

5. The vehicle body structure as set forth in claim 2, wherein
   the body portion of the reinforcement member includes an opening encompassed by a protruding rim that extends in a longitudinal direction of the gusset.

6. The vehicle body structure as set forth in claim 2, wherein
   the body portion of the reinforcement member is oriented generally parallel to the side wall member.

7. The vehicle body structure as set forth in claim 6, wherein
   the body portion of the reinforcement member includes an opening encompassed by a protruding rim that extends in a longitudinal direction of the gusset.

8. The vehicle body structure as set forth in claim 1, wherein
   the reinforcement member has an overall height that extends a majority of the first and second gusset portions as measured from the top gusset portion to free ends of the first and second gusset portions.

9. The vehicle body structure as set forth in claim 8, wherein
   the reinforcement member includes a body portion that extends between the first and second gusset portions and is oriented generally parallel to the side wall member.

10. The vehicle body structure as set forth in claim 9, wherein
    the body portion of the reinforcement member includes an opening encompassed by a protruding rim that extends in a longitudinal direction of the gusset.

11. The vehicle body structure as set forth in claim 1, wherein
    the side wall attachment end of the gusset includes a single attachment flange that extends outwardly from the first gusset portion, the top gusset portion and the second gusset portion.

12. The vehicle body structure as set forth in claim 11, wherein
    the attachment flange is attached to a B-pillar structure of the side wall members.

13. The vehicle body structure as set forth in claim 1, wherein
    the side wall structure includes a B-pillar structure with the side wall attachment end of the gusset being fixed to the B-pillar structure.

14. The vehicle body structure as set forth in claim 1, wherein
    the reinforced floor portion includes a lateral cross member with the floor attachment end of the gusset attached the lateral cross member.

15. The vehicle body structure as set forth in claim 14, wherein
    the side wall structure includes a B-pillar structure with the side wall attachment end of the gusset being fixed to the B-pillar structure.

16. The vehicle body structure as set forth in claim 15, wherein the top gusset portion slopes upwardly from the floor attachment end of the gusset to the side wall attachment end of the gusset.

17. The vehicle body structure as set forth in claim 1, wherein the top gusset portion slopes upwardly from the floor attachment end of the gusset to the side wall attachment end of the gusset.

18. The vehicle body structure as set forth in claim 16, wherein the reinforcement member has an overall height that extends a majority of the first and second gusset portions as measured from the top gusset portion to free ends of the first and second gusset portions.

19. The vehicle body structure as set forth in claim 18, wherein the first and second flange portions are each fastened at two points to the first and second gusset portions, respectively.

* * * * *